Feb. 26, 1957 G. M. CROIL 2,782,828
TIRE CHAIN AND APPLICATOR

Filed Jan. 31, 1955 4 Sheets-Sheet 1

INVENTOR
GEORGE M. CROIL
BY
Fetherstonhaugh & Co.
ATTORNEYS

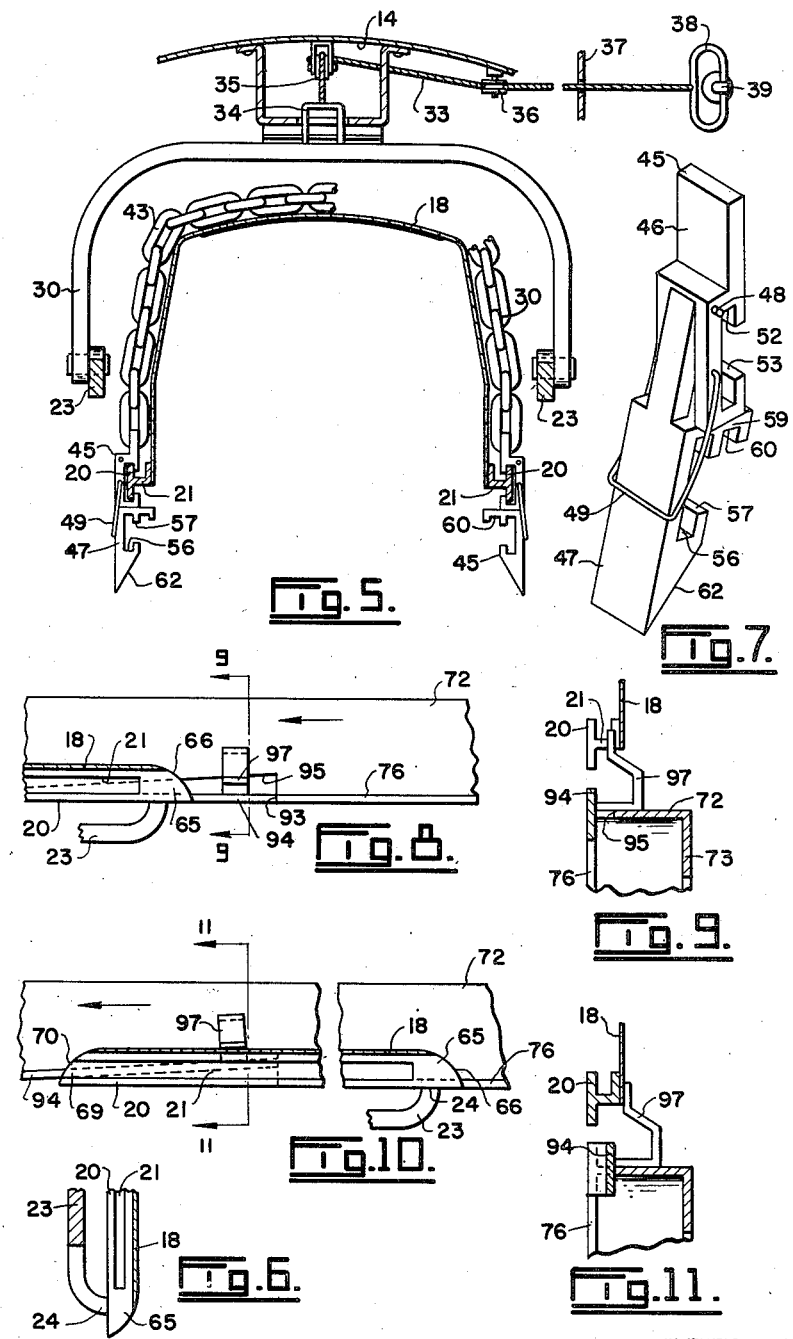

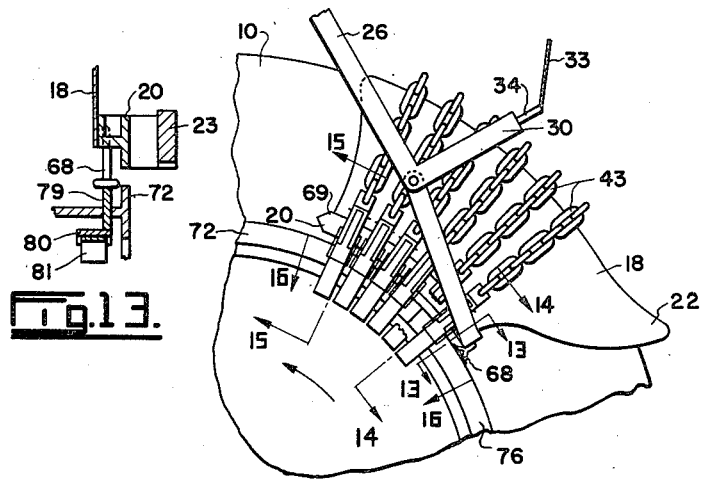
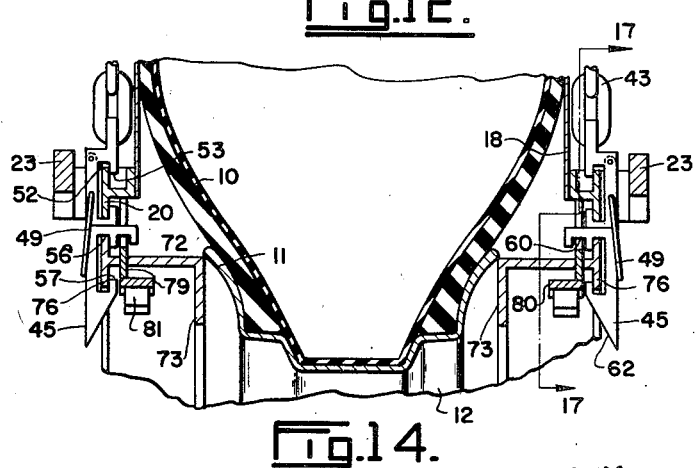
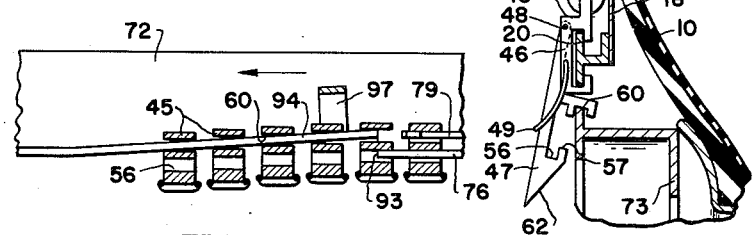

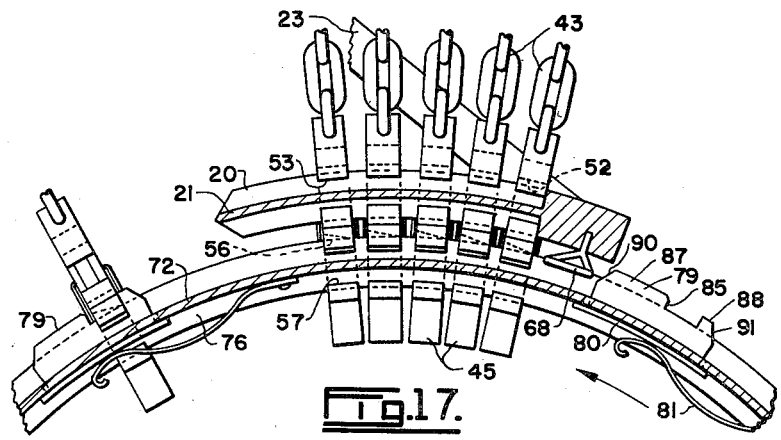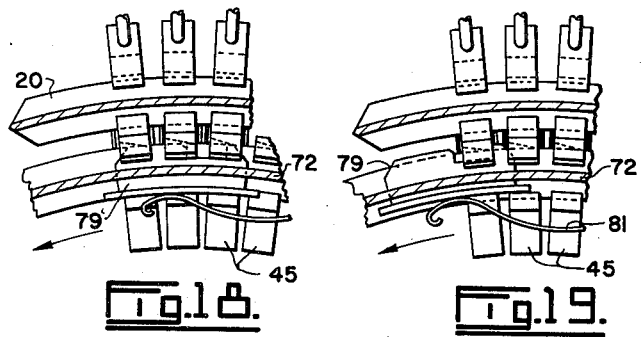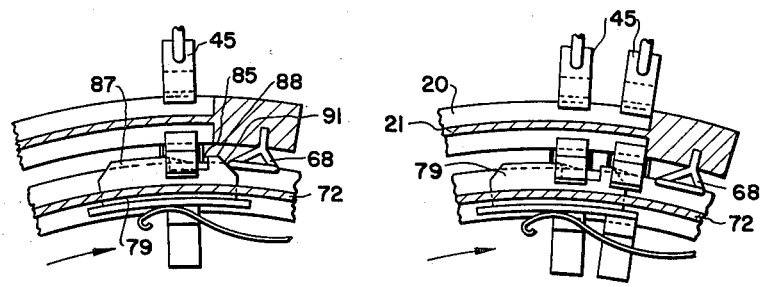

United States Patent Office 2,782,828
Patented Feb. 26, 1957

2,782,828

TIRE CHAIN AND APPLICATOR

George Mitchell Croil, West Vancouver, British Columbia, Canada

Application January 31, 1955, Serial No. 485,091

14 Claims. (Cl. 152—214)

This invention relates to chains for vehicle wheels and applicators therefor.

Chains are applied to vehicle wheels when the vehicles are driven in snow or soft ground or mud. Up to the present time, it has been necessary to apply each chain to its wheel. This is rather difficult to do owing to the fact that both wheels are partly covered by a mudguard, such as is the case in modern passenger cars, and it can be a difficult and dirty job if it is necessary to do it out on the road.

The main purpose of the invention is to eliminate the necessity of applying a tire chain to a vehicle wheel by providing cross chains normally carried by an applicator or carrier positioned above the wheel. When necessary, the carrier may be lowered, and the apparatus includes a rim arrangement on the wheel which draws the cross chains off the carrier as the wheel is rotated. These cross chains are spaced equally around the wheel.

The apparatus according to this invention includes a carrier which is substantially in the form of an inverted U. A plurality of cross chains are positioned on this carrier, and each chain has a slide at each end thereof which projects downwardly from the carrier towards the wheel above which the carrier is mounted. A rim or track is mounted on the wheel, and this includes means for removing the cross chains one at a time from the carrier when the latter is lowered towards the wheel. Latch means are provided on the rim for selectively engaging the chain slides and drawing them off the carrier. After this has been completed, when the carrier is lifted away from the wheel, the vehicle may operate in the usual manner, in which case the cross chains function in the same manner as an ordinary tire chain.

When it is desired to remove the cross chains, it is only necessary to drop the carrier back down on to the tire. The wheel is then turned in the opposite direction to the first action, and the cross chains are scooped up one at a time back on to the carrier. Then the carrier is raised away from the wheel.

This apparatus makes it possible to place the cross chains on and remove them from the vehicle tire without the driver having to touch them or, if desired, without leaving the driver's seat. This saves a lot of time and effort, and it eliminates the necessity of jacking up the wheel or having to struggle with the cross chains in dirt or snow.

Figure 1:
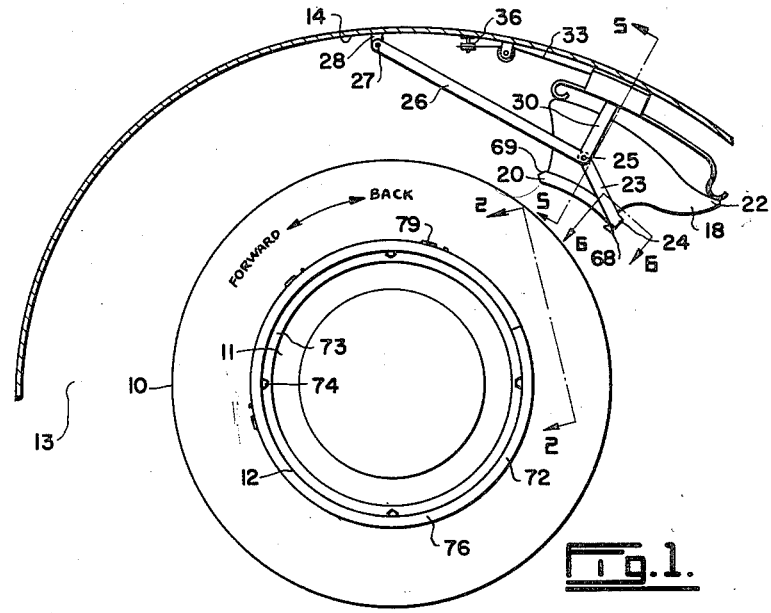
Figure 3:
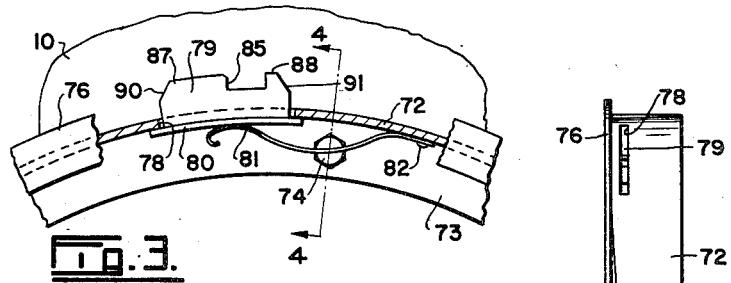
Figures 2, 4:
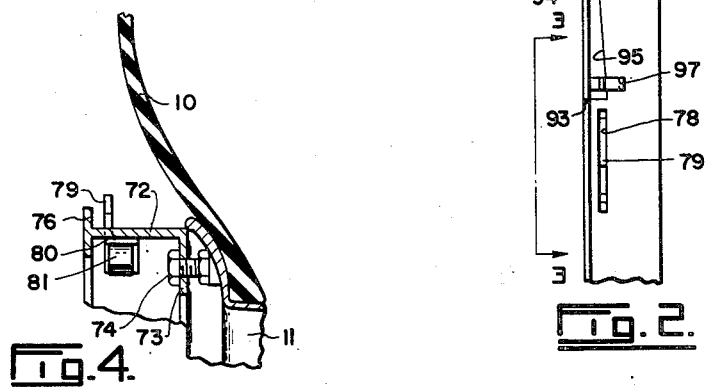

An example of the present invention is illustrated in the accompanying drawings, in which, Figure 1 diagrammatically illustrates a vehicle wheel with the special rim thereon, showing the carrier in its normal position above said wheel, Figure 2 is an elevation of the special rim, see line 2—2 of Figure 1, Figure 3 is an enlarged fragmentary side elevation of a part of this rim, with part of the latter broken away, Figure 4 is a section taken substantially on the line 4—4 of Figure 3, Figure 5 is an enlarged cross section through the carrier in its normal elevated position, taken on the line 5—5 of Figure 1, Figure 6 is an enlarged section taken on the line 6—6 of Figure 1, Figure 7 is a perspective view of a cross chain slide, Figure 8 is a plan view of a portion of the rim or track, Figure 9 is a section taken on the line 9—9 of Figure 8, Figure 10 is a view similar to Figure 8 with the rim shifted a little to the left, Figure 11 is a section taken on the line 11—11 of Figure 10, Figure 12 is a side elevation of the carrier lowered on to a tire, Figure 13 is a fragmentary section taken on the line 13—13 of Figure 12, Figure 14 is an enlarged cross section taken substantially on the line 14—14 of Figure 12, Figure 15 is a fragmentary section taken on the line 15—15 of Figure 12, Figure 16 is a substantially horizontal section taken on the line 16—16 of Figure 12, Figure 17 is an enlarged sectional view taken substantially on the line 17—17 of Figure 14, showing one slide removed from the carrier and a latch means of the rim or track approaching the slides still on the carrier, Figure 18 is a fragmentary view similar to Figure 17 with the latch means moving through the slides on the carrier, Figure 19 is a view similar to Figure 18 with the latch means gripping a slide to remove it from the carrier, Figure 20 is a fragmentary sectional view showing a rim latch means returning a slide to the carrier, and Figure 21 is a view similar to Figure 20 showing another slide being returned to the carrier.

Referring to Figures 1 to 7 of the drawings, 10 diagrammatically illustrates a pneumatic tire mounted on an ordinary rim 11 of a vehicle wheel 12. This wheel is mounted in a wheel well 13, the top of which is illustrated at 14.

A carrier 18 is mounted in the wheel well 13 above a portion of the tire 10, and this carrier may be raised or lowered in any convenient manner. In this example, the carrier is substantially in the form of an inverted U, see Figure 5, and it may be formed of any desired light but strong material, such as light metal or strong plastic. The carrier has a track 20 extending longitudinally thereof at the free edge of each of its sides. Each track extends above and below a web 21 which spaces it outwardly from the adjacent side of the carrier. The carrier is formed with a flared end 22 extending upwardly therefrom.

A short arm 23 is connected at one end 24 to one end of each track 20, said arm extending upwardly and longitudinally of the carrier to a point where it is connected by a pivot 25 to an L-shaped arm 26, one end of which is pivotally connected at 27 to a bracket 28 secured to the top 14 of the wheel well. There is an arm 26 on each side of the carrier, and these arms are provided with portions 30 which extend upwardly and over the top of the carrier, where they are joined together, see Figure 5. The portions 30 of the arms form a U-shaped bracket extending over the carrier and spaced from the latter.

One simple means of raising and lowering the carrier 18 is illustrated in Figures 1 and 5. One end of a cable 33 is secured by a bracket 34 to the U-shaped bracket 30, said cable extending upwardly and over a pulley 35 carried by the well top 14, around another pulley 36 and through the wall 37 of the vehicle, a portion of which is shown in Figure 5, into said vehicle. As tire chains are applied to the rear wheels of vehicles, this cable may extend into the trunk area of said vehicle. A handle 38 is secured to the inner end of the cable and engages a hook 39 to keep the carrier 18 in its suspended position. When the handle is removed from the hook, the carrier drops down on to the tire 10. This handle and hook arrangement may be in the vehicle trunk or located somewhere near the driver's seat.

A plurality of cross chains 43 normally rest on and extend over the top of carrier 18. Each chain has a slide 45 at each end thereof. Each of these slides is formed in two sections movably connected together in any desired manner. The slides shown in the drawings are formed in upper and lower sections 46 and 47 hingedly connected together at 48, see Figure 7. The slide sections are normally held in line with each other by any suitable spring means, such as a spring 49, although Figure 7 shows the sections out of alignment.

The upper section 46 of each slide is provided with a trackway 52 having a slot 53 in the side thereof opening out from the section. This trackway is adapted to receive the track 20 of the carrier, with the web 21 extending through slot 53.

The lower section 47 of each slide is provided with a trackway 56 which is normally in line with and spaced below the trackway 52. Trackway 56 has a slot 57 in the side thereof and opening out from the slide. A small L-shaped flange 59 projects laterally from section 47 to form a small trackway 60 beside and at the top of trackway 56. The inner surface of the lower section is bevelled as at 62.

The rearward end 65 of each track 20 and web 21 is formed with a bevel 66, see particularly Figures 8 and 10. Furthermore, a depressor 68 extends downwardly from each track adjacent the rearward end thereof. The forward end 69 of the track also is formed with a bevel 70.

The apparatus described so far works in conjunction with an annular chain rim 72 which has a flange 73 at its inner edge, said flange being secured by bolts 74 to the ordinary rim 11 of the wheel, see Figures 2 to 4. Of course, rim 72 may be formed integrally with or permanently secured to rim 11, if desired, in which case flange 73 might not be required. An annular track 76 is secured to and extends above and below the outer edge of rim 72.

The rim 72 is provided with aligned slots 78 therein at spaced intervals throughout the length thereof. Each slot has a latch 79 projecting upwardly therethrough, see Figure 3, each latch having a shoulder 80 along its lower edge for preventing it from moving completely through its slot. The latch is resiliently held in position in any suitable manner, such as by means of a spring 81 bearing against the bottom thereof, said spring being anchored to the undersurface of the rim 72 at 82. Each latch 79 is formed with a rectangular notch 85 in its upper edge, said notch dividing said upper edge into front and rear shoulders 87 and 88, the former being longer than the latter. The front and rear ends of the latch are bevelled at 90 and 91, respectively.

Track 76 is split at 93, see Figures 2, 8, 10 and 16, to form a gate section 94, said section being opposite a notch 95 formed in rim 72. This notch is relatively wide at the split 93 in track 76, and it tapers out to nothing at its opposite end at the edge of the rim. With this arrangement, the gate section 94 of the track may be swung inwardly so that its free end is out of line with the adjacent end of the remainder of track 76. This is clearly shown in Figure 16. A lug 97 is connected to the gate section 94 adjacent its free end and extends upwardly from said section, see Figures 9 and 11.

The operation of this equipment is as follows:

As previously stated, the carrier 18 is normally retained in its upper position, as shown in Figure 1, where it is clear of the tire 10. When it is desired to apply the cross chains 43 to the tire, handle 38 is released from hook 39 to allow the arms 26 to pivot about the point 27 so that the carrier drops down on to the tire. The vehicle is then moved forwardly to turn wheel 12 in the same direction. This moves chain rim 72 forwardly. There is a rim 72 on each side of the regular rim 11 of the tire, see Figure 14, but as the action is the same on each rim, this action will now be described only in connection with one rim. It will be understood that the same action takes place on both sides of tire 10.

When the carrier drops down on to the tire, bevels 62 of the lower sections 47 of the slides 45 engage the track 76 to swing said lower sections upwardly, as shown in Figure 15. At this time, the track enters the small trackway 60 of the slide, see Figure 15. As rim 72 rotates forwardly, each slide rides along track 76. Eventually, lug 97 is engaged by the bevelled end 66 of the track 20 and web 21 of the carrier, and this moves the lug inwardly to swing the gate section 94 of the track in the same direction and into the position shown in Figures 10 and 16. This moves the trackways 56 of the slides on the carrier track into line with the fixed portion of track 76. Thus, as rim 72 continues to rotate forwardly, the track enters these guideways 56. This is clearly shown in Figure 14.

Figures 17, 18 and 19 illustrate the manner in which the slides and the cross chains connected thereto are removed from the track 20 of the carrier. As each latch 79 approaches the carrier, it is depressed by the depressor 68. The latch then enters the trackways 60 of the slides on the carrier. As long as there is a portion of the trackway of one of the slides over the forward shoulder 87 of the latch, the latter is maintained in its depressed position. However, when the forward shoulder clears the last slide relative to its direction of movement, the latch is forced upwardly by spring 81 so that said last slide is caught in notch 85 of the latch, see Figure 19. This slide then moves with the latch so that it is drawn off the carrier track and, at the same time, its chain 43 is drawn off the carrier. Figure 17 shows one of the slides moving away from the carrier track, while another latch is approaching said track. As there is a latch 79 for each slide, all the sides are removed from the carrier and equally spaced around rim 72. This means that the cross chains 43 are spaced around the tire 10.

As soon as the cross chains are on the tire, the carrier is returned to its elevated position by means of cable 33. The flared end 22 of the carrier would cause the latter to be lifted by the chains should the carrier not be lifted as soon as all the chains are on the tire. Each chain would enter the flared end and would lift the carrier as it moved beneath the latter. Each cross chain 43 has a slide at each of its opposite ends, and these slides are secured to the tracks 76 of the two rims 72 on opposite sides of the wheel. Latches 79 prevent these slides from moving relative to their respective tracks. Thus, the cross chains function in the same manner as an ordinary tire chain.

When it is desired to remove the cross chains, it is only necessary to lower the carrier 18 until it rests on top of the tire again. The vehicle is then reversed to rotate each rim 72 in the same direction. As the first cross chain approaches the carrier, it rides up on to the top of the latter since its forward end is close to the tire. At the same time, each slide 45 of this chain moves on to the carrier track 20, since said track is in line with the upper trackway 52 thereof. As the rim continues to rotate rearwardly, shoulder 88 of the latch 79 engages the depressor 68 and is depressed thereby, thus freeing the slide of the notch 85 of this latch. This action is shown in Figures 20 and 21. The slide of the next chain rides on the carrier track 20 and is moved until it abuts against the slide already on said track. At this time, the bevelled portion 91 of shoulder 88 moves into the trackway 60 of the first slide on the carrier track so that this latch is also depressed, to free the second slide.

If the gate section 94 of track 76 approaches the carrier, as the slides are being returned to the latter, the bevel 70 of the end 69 of the carrier track engages lug 97 to open the gate section. When this takes place, the slides that are on the carrier track move off track 76 at the split 93 thereof so that when they pass the gate section, they assume the position shown in Figure 15. It is only necessary to move the vehicle in reverse until all the slides are on the carrier and free of the track 76. Then the carrier is raised to its normal inoperative position by means of cable 33.

From the above it will be seen that this apparatus may be operated quickly and easily to apply a plurality of cross chains to a vehicle tire, and to remove said cross chains in the same manner. It is only necessary to drive the vehicle in one direction to apply the cross chains to the tire, and to drive it in the opposite direction to remove said chains.

What I claim is:

1. In vehicle tire chains and applicator therefor the combination comprising a carrier subsantially in the shape of an inverted U, means normally retaining the carrier on a vehicle clear of a vehicle tire, said carrier on being released dropping down on to and straddling the tire, a chain rim on each side of and concentric with the tire rim on which the vehicle tire is mounted, an annular track carried by each chain rim, a plurality of cross chains extending transversely over the carrier and slidably carried thereby, slides secured to the ends of the cross chains at the lower edges of the carrier, trackways in the slides for receiving the annular chain rim tracks when the carrier is on the tire, and latches mounted on the chain rims for engaging the slides and removing the chains from the carrier when the wheel is rotated in one direction, said chains riding back on to the carrier and the latches releasing the slides thereof when the wheel is rotated in the opposite direction.

2. In vehicle tire chains and applicator therefor the combination comprising a carrier substantially in the shape of an inverted U, means normally retaining the carrier on a vehicle clear of a vehicle tire, said carrier on being released dropping down on to and straddling the tire, a chain rim on each side of and concentric with the tire rim on which the vehicle tire is mounted, an annular track carried by each chain rim, a track extending along each of the lower edges of the carrier, said carrier tracks being concentric with the annular chain rim tracks when the carrier is down, a plurality of cross chains extending transversely over the carrier and slidably carried thereby, slides secured to the ends of the cross chains at the lower edges of the carrier, trackways in the slides through which the carrier tracks extend, other trackways in the slides for receiving the annular chain rim tracks when the carrier is on the tire, and latches mounted on the chain rims for engaging the slides and removing them from the carrier tracks and the chains from the carrier when the wheel is rotated in one direction, said chains riding back on to the carrier with their slides on the tracks thereof and the latches releasing said slides when the wheel is rotated in the opposite direction.

3. Vehicle tire chains and applicator as claimed in claim 2 in which each latch is resiliently mounted on its chain rim and radiates therefrom, each latch having a notch in its outer edge dividing said edge into front and rear shoulders.

4. Vehicle tire chains and applicator as claimed in claim 2 in which each slide is formed in upper and lower sections hingedly connected together, the trackways for the carrier track and the annular chain rim track being in the upper and lower sections respectively, and including means normally maintaining the slide sections and their trackways in vertical alignment.

5. Vehicle tire chains and applicator as claimed in claim 4 in which the lower section of each slide has an additional trackway beside the trackway for the annular track.

6. Vehicle tire chains and applicator as claimed in claim 2 in which each annular chain rim track is formed with a gate section adapted to open inwardly towards the tire rim, and including means on the gate section engageable by part of the carrier to open said section as the section moves in either direction past the carrier when the latter is on the tire.

7. In vehicle tire chains and applicator therefor the combination comprising a carrier substantially in the shape of an inverted U, means normally retaining the carrier on a vehicle clear of a vehicle tire, said carrier on being released dropping down on to and straddling the tire, a chain rim on and concentric with the tire rim on which the vehicle tire is mounted, an annular track carried by the chain rim, a portion of said chain rim track forming a gate section adapted to swing inwardly towards the tire rim, a cross chain extending transversely over the carrier and slidably carried thereby, a slide secured to an end of the cross chain at the lower edge of the carrier, said slide overlapping the annular chain rim track when the carrier is on the tire, a trackway in the slide which receives the annular chain rim track when the gate section is opened as it moves by the carrier, and a latch on the chain rim for engaging the slide and removing the chain from the carrier when the wheel is rotated in one direction, said chain riding back on to the carrier, the latch releasing the slide and the annular chain rim track withdrawing from the trackway when the wheel is rotated in the opposite direction.

8. Vehicle tire chains and applicator as claimed in claim 7 in which the slide is formed with upper and lower sections hingedly connected together with the trackway of said slide in said lower section, and including means normally maintaining the slide sections in vertical alignment.

9. Vehicle tire chains and applicator as claimed in claim 8 in which the slide has an additional trackway beside the trackway for the annular chain rim track, said additional trackway engaging the annular chain rim track when the carrier drops on to the tire.

10. In vehicle tire chains and applicator therefor the combination comprising a carrier substantially in the shape of an inverted U, means normally retaining the carrier on a vehicle clear of a vehicle tire, said carrier on being released dropping down on to and straddling the tire, a chain rim on and concentric with the tire rim on which the vehicle tire is mounted, an annular track carried by the chain rim, a portion of said chain rim track forming a gate section adapted to swing inwardly towards the tire rim, a track extending along the lower edge of the carrier above and concentric with the annular chain rim track when the carrier is down, a cross chain extending transversely over the carrier slidably carried thereby, a slide secured to an end of the cross chain, said slide being formed in upper and lower sections hingedly connected together, means normally maintaining the slide sections in vertical alignment, a trackway in the slide upper section through which the carrier track normally extends, said slide overlapping the annular chain rim track when the carrier is on the tire, a trackway in the slide lower section which receives the annular chain rim track when the gate section is opened at it moves by the carrier, and a latch on the chain rim for engaging the slide and removing the chain from the carrier when the wheel is rotated in one direction; said chain riding back on to the carrier with the upper trackway of its slide receiving the carrier track, the latch releasing the slide and the annular chain rim track withdrawing from the lower trackway when the wheel is rotated in the opposite direction.

11. Vehicle tire chains and applicator as claimed in claim 10 including an additional trackway beside the trackway in the lower section of the slide, said additional trackway engaging the annular chain rim track when the carrier drops on to the tire.

12. Vehicle tire chains and applicator as claimed in claim 11 in which the latch is spaced inwardly from the chain rim track and is resiliently mounted on the chain rim and radiates therefrom, said latch having a notch in its outer edge dividing said edge into front and rear shoulders, and the latch entering the additional trackway of the lower slide section as the latch moves past the carrier and when the chain rim track is in the first-mentioned trackway of said lower slide section.

13. Vehicle tire chains and applicator as claimed in claim 12 including depressing means on the carrier for engaging the latch shoulders to depress the latch as the latter moves past the carrier.

14. In vehicle tire chains and applicator therefor the combination comprising a carrier substantially in the shape of an inverted U, means normally retaining the carrier on a vehicle clear of a vehicle tire, said carrier on being released dropping down on to and straddling the tire, a chain rim on and concentric with the tire rim on which the vehicle tire is mounted, an annular track carried by the chain rim, a portion of said chain rim track forming a gate section adapted to swing inwardly towards the tire rim, means on the gate section engagable by part of the carrier to open said section as the section moves in either direction past the carrier when the latter is on the tire, a cross chain extending transversely over the carrier and slidably carried thereby, a slide secured to an end of the cross chain at the lower edge of the carrier, said slide overlapping the annular chain rim track when the carrier is on the tire, a trackway in the slide which receives the annular chain rim track when the gate section is opened as it moves by the carrier, and a latch on the chain rim engaging the slide and removing the chain from the carrier when the wheel is rotated in one direction, said chain riding back on the carrier, the latch releasing the slide and the annular chain rim track withdrawing from the trackway when the wheel is rotated in the opposite direction.

References Cited in the file of this patent
UNITED STATES PATENTS

| | | |
|---|---|---|
| 2,033,115 | Crabtree | Mar. 10, 1936 |
| 2,255,178 | Machain | Sept. 9, 1941 |